United States Patent
Angelsmark et al.

(10) Patent No.: US 10,169,578 B2
(45) Date of Patent: Jan. 1, 2019

(54) MIGRATION SERVICE METHOD AND MODULE FOR SOFTWARE MODULES

(71) Applicant: Telefonaktiebolaget L M Ericsson (publ), Stockholm (SE)

(72) Inventors: Ola Angelsmark, Ystad (SE); Per Persson, Sodra Sandby (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 206 days.

(21) Appl. No.: 14/647,090

(22) PCT Filed: May 8, 2015

(86) PCT No.: PCT/EP2015/060154
§ 371 (c)(1),
(2) Date: May 23, 2015

(87) PCT Pub. No.: WO2016/180433
PCT Pub. Date: Nov. 17, 2016

(65) Prior Publication Data
US 2017/0147811 A1    May 25, 2017

(51) Int. Cl.
G06F 21/55    (2013.01)
G06F 21/53    (2013.01)
G06F 17/30    (2006.01)
H04L 29/06    (2006.01)

(52) U.S. Cl.
CPC ...... *G06F 21/554* (2013.01); *G06F 17/30079* (2013.01); *G06F 21/53* (2013.01); *H04L 63/1425* (2013.01)

(58) Field of Classification Search
CPC .................................................. G06F 21/554
See application file for complete search history.

(56) References Cited

U.S. PATENT DOCUMENTS 5,832,274 A * 11/1998 Cutler ............... G06F 17/30067
707/E17.005
8,296,615 B2 * 10/2012 Rajamony ........ G06Q 10/06313
705/7.12
8,341,626 B1 * 12/2012 Gardner ................ G06F 9/4856
718/1

(Continued)

FOREIGN PATENT DOCUMENTS

WO    2014000787 A1    1/2014

OTHER PUBLICATIONS

Ray et al.; Virtualization security; Proceeding CSIIRW '09 Proceedings of the 5th Annual Workshop on Cyber Security and Information Intelligence Research:Cyber Security and Information Intelligence Challenges and Strategies;Article No. 42;Oak Ridge, Tennessee,USA Apr. 13-15, 2009; ACM Digital Library (Year: 2009).*

(Continued)

*Primary Examiner* — Bradley Holder
(74) *Attorney, Agent, or Firm* — Leffler Intellectual Property Law, PLLC

(57) ABSTRACT

A migration service and module for software modules are disclosed. The migration service detects a security flaw in a first environment in which the software modules are running and migrates the software modules or part of the software modules from the first environment to a second environment when a security flaw is detected.

10 Claims, 3 Drawing Sheets

(56) References Cited

U.S. PATENT DOCUMENTS

| | | | |
|---|---|---|---|
| 8,661,434 B1* | 2/2014 | Liang | G06F 9/45558 709/220 |
| 8,789,179 B2* | 7/2014 | Sabin | G06F 21/554 713/187 |
| 8,813,240 B1* | 8/2014 | Northup | G06F 21/554 726/22 |
| 9,298,927 B2* | 3/2016 | Lietz | G06F 21/577 |
| 9,401,904 B1* | 7/2016 | Hankins | H04L 63/08 |
| 2006/0026195 A1* | 2/2006 | Gu | H04L 41/0846 |
| 2010/0175063 A1* | 7/2010 | Ciano | G06F 9/4862 718/1 |
| 2012/0131173 A1* | 5/2012 | Ferris | G06F 9/5066 709/224 |
| 2012/0137285 A1* | 5/2012 | Glikson | G06F 9/5077 718/1 |
| 2012/0151476 A1* | 6/2012 | Vincent | G06F 9/45558 718/1 |
| 2012/0159634 A1 | 6/2012 | Haikney et al. | |
| 2012/0192181 A1* | 7/2012 | Gilbert | G06F 9/45558 718/1 |
| 2013/0111540 A1* | 5/2013 | Sabin | G06F 21/554 726/1 |
| 2013/0238786 A1 | 9/2013 | Khesin | |
| 2014/0068728 A1* | 3/2014 | Kim | G06F 21/6245 726/5 |
| 2014/0157268 A1* | 6/2014 | Gilbert | G06F 9/45558 718/1 |
| 2014/0201365 A1* | 7/2014 | Ashok | H04L 45/302 709/225 |
| 2014/0258487 A1 | 9/2014 | Heninger et al. | |
| 2014/0359769 A1* | 12/2014 | Sabin | G06F 21/554 726/23 |
| 2015/0096011 A1 | 4/2015 | Watt | |
| 2015/0242634 A1* | 8/2015 | Lietz | G06F 21/577 726/25 |

OTHER PUBLICATIONS

Jin et al.; Architectural support for secure virtualization under a vulnerable hypervisor; Published in: 2011 44th Annual IEEE/ACM International Symposium on Microarchitecture (MICRO); Date of Conference: Dec. 3-7, 2011; IEEE Xplore (Year: 2011).*
PCT International Search Report, dated Jan. 22, 2016, in connection with International Application No. PCT/EP2015/060154, all pages.
PCT Written Opinion, dated Jan. 22, 2016, in connection with International Application No. PCT/EP2015/060154, all pages.

* cited by examiner

MIGRATION SERVICE METHOD AND MODULE FOR SOFTWARE MODULES

TECHNICAL FIELD

Embodiments herein relate to a migration service module and a method therein. In particular, they relate to migrating software modules from one environment to another environment when a security flaw is detected.

BACKGROUND

Nowadays computing environment, networks or systems, which comprises e.g. computers or servers for running different applications or services, usually suffer from security problems. When a security problem, such as the recent 'shell shock exploit' is discovered in a server or computer in the system or network, there are few options on how to handle this. The most common approach is to hope that the system will not be compromised until a patch is developed and applied. A more secure approach is to stop the server or computer, or unplug it from the network, and wait for a security update before reconnecting it.

The problem with current solutions is that before a security update is developed and applied, the server is either vulnerable, or unavailable. This may not be acceptable for some applications and services running on the server.

The security problems become even more common and challenging in cloud computing, which is network-based computing and involves large collections of servers housed in data centers to provide computational resources and data storage. Cloud computing involves deploying groups of remote servers and software networks that allow different kinds of data sources be uploaded for real time processing to generate computing results without the need to store processed data in the cloud. Cloud computing relies on sharing of resources to achieve coherence and economies of scale over a network and also focuses on maximizing the effectiveness of the shared resources. Therefore, unplugging or stopping the servers which has security problems is not an attractive solution.

U.S. Pat. No. 8,813,240 describes technologies relating to defensive techniques for improving computer security. The system can monitor a virtual machine's clock accesses and determine whether the number of clock accesses exceeds a threshold. If the number of clock accesses exceeds the threshold, the system can determine that the virtual machine is executing a malicious process e.g., a side channel attack. The system can then limit the virtual machine's ability to access the clock. For example, the system can limit the frequency at which the virtual machine accesses the clock. In addition, the system can migrate one or more of the virtual machines hosted on the physical machine to a different physical machine. Therefore the method in U.S. Pat. No. 8,813,240 describes how to 'escape' a running malicious process once it has been discovered within the system and the solution hinges on first identifying the malicious process. Further, migrating one or more of the virtual machines in whole may be complicated and not necessary for other security problems.

SUMMARY

Therefore it is an object of embodiments herein to provide an improved way of handling security problems in a computing environment.

According to a first aspect of embodiments herein, the object is achieved by a migration service method for software modules. According to this method, when a security flaw in a first environment in which the software modules are running is detected, the software modules or part of the software modules is migrated from the first environment to a second environment.

According to a second aspect of embodiments herein, the object is achieved by a migration service module for software modules. The migration service module is configured to detect a security flaw in a first environment in which the software modules are running and migrate the software modules or part of the software modules from the first environment to a second environment when a security flaw is detected.

According to embodiments herein, when a security problem is discovered in an environment, such as in a computing platform or an operating system, the software modules, e.g. applications or services, executing on top of it are moved automatically to another environment, e.g. a computer or server running a platform or operating system that does not have the security problem. For example, If the first environment is running a certain version of an operating system that is found to have a security flaw, services executing on it can be migrated—in full or only partially— to another environment running an operating system without this flaw. In this way, both the first environment and the software modules, applications or services, being migrated to another environment, are available even during a security breach.

Thus, embodiments herein provide an improved way of handling security problems in a computing environment by migrating software modules from one environment which has security problems to another secure environment.

BRIEF DESCRIPTION OF THE DRAWINGS

Examples of embodiments herein are described in more detail with reference to attached drawings in which.

DETAILED DESCRIPTION

Figure 1:
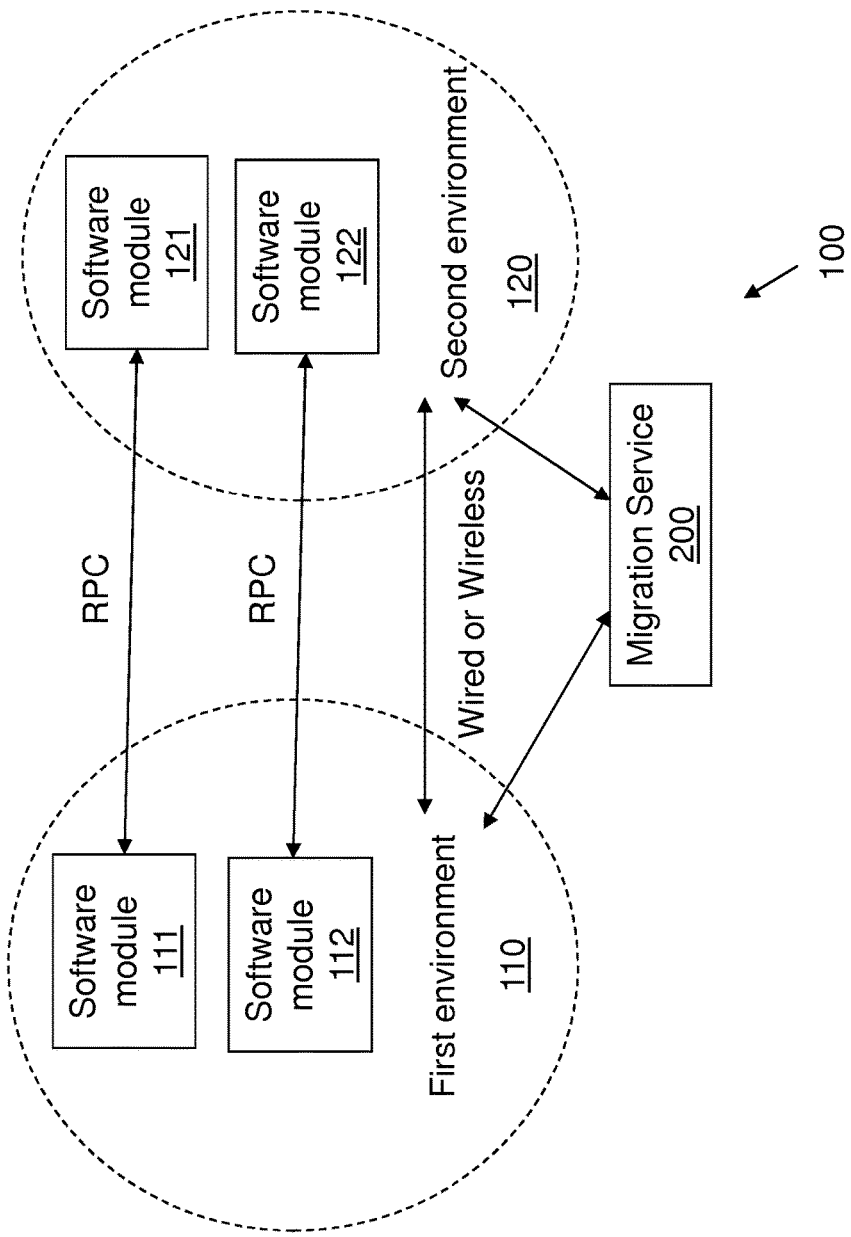
FIG. 1 is a block diagram illustrating an example of computing environments.

FIG. 1 depicts an example of computing environments 100 in which embodiments herein may be implemented. In this context, an environment may be referred to a computing network, a computing system, a platform, a host, a data center, a site, a cloud etc. The computing environments 100 comprise one or more environments, where a first environment 110, a second environment 120 are shown, and they are connected or able to communicate with each other via a wired or wireless connection. Each environment 110, 120 may be a physical machine such as a server, a computer or a virtual machine, a Linux container or a Docker module. A virtual machine is an emulation of a particular computer system. Virtual machines operate based on the computer architecture and functions of a real or hypothetical computer, and their implementations may involve specialized hardware, software, or a combination of both. A Linux container is an operating-system-level virtualization environment for running multiple isolated Linux systems or containers on a single Linux control host. Docker is a tool for packaging an application and its dependencies in a virtual container. A Docker module is a software module which contains and runs an application, from the Docker which manages packaging and deployment of such Docker modules.

Nowadays, it is common for a cloud application, or a cloud service, to consist of multiple parts, i.e. a number of software modules, each executing in its own separate environment, e.g. software modules 111, 112 in the first environment 110, software modules 121, 122 in the second environment 120. The different parts or software modules usually communicate via some form of Remote Procedure Call (RPC), a message bus, or similar.

Some of these software modules may be more important than others, for example, they may be more critical for the functionality of the service, contain sensitive information, or similar. It may be necessary to protect them extra carefully if or when a security flaw has been discovered.

Figure 2:
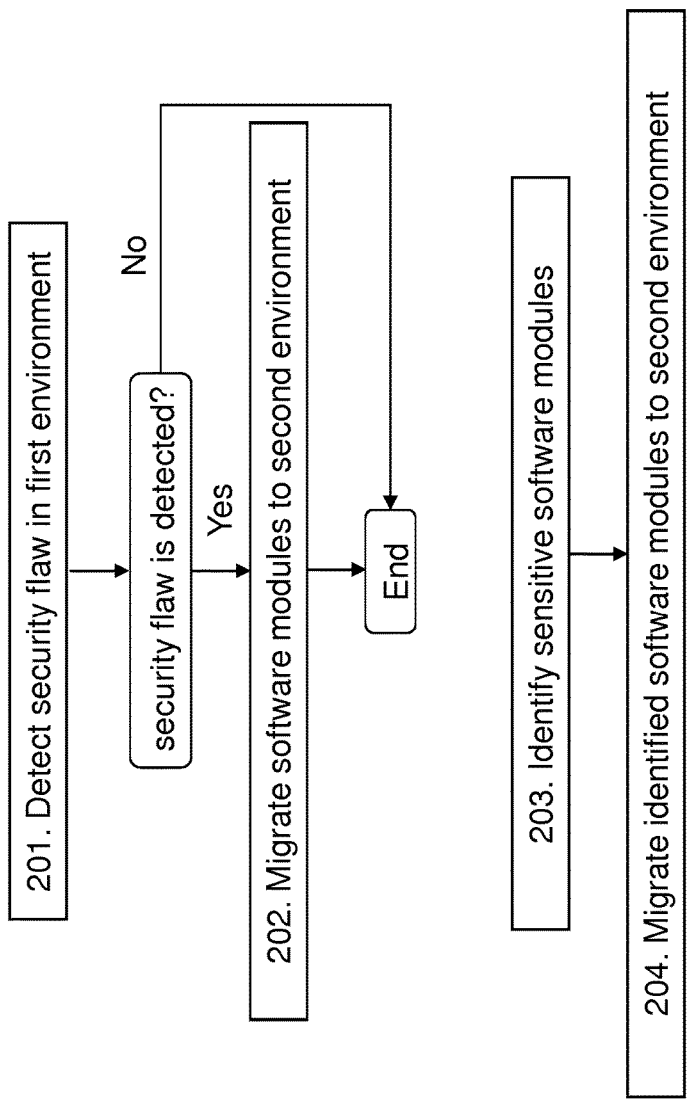
FIG. 2 is a flowchart depicting one embodiment of a migration service method.

According to some embodiments herein, in order to provide extra protection for the software modules running on an environment, a migration service 200 for software modules 111, 112, 121, 122 is provided for handling security problems in an environment, e.g. the first and/or second environments 110, 120. A method performed by the migration service 200 will now be described with reference to FIG. 2. The method comprises the following actions.

Action 201

The migration service 200 detects a security flaw in a first environment in which the software modules 111, 112 are running.

Action 202

When a security flaw is detected, the migration service 200 migrates the software modules 111, 112 or part of the software modules from the first environment 110 to a second environment 120.

By migrating the software modules or part of the software modules to a second environment 120, the software modules or part of the software modules may be migrated to a more protected environment, for example one which does not contain the security flaw.

According to some embodiments herein, only parts, i.e. the sensitive parts, of the software modules are migrated, then the method may further comprise the following actions:

Action 203

The migration service 200 identifies the software modules which are sensitive to the security flaw based on a pre-determined or calculated sensitivity rating. For example, some software modules are more critical for the functionality of the service, contain sensitive information etc. and may have a label with sensitivity rating.

Services with a pre-determined sensitivity rating may include services working with e.g. patient journals, banking information, and other data which should not be released to the public. Additionally, frequently used service, such as a popular search engine, or a service which may hurt business if it went down, may have a default high sensitivity rating.

A service which depends on, e.g. a software module with a known security flaw may have a high sensitivity rating. Sensitivity rating may also depend on who is currently using the service. For example, a service which is normally not very important may become rather more important when, e.g., a Fortune 500 company, or the military, is using it. Consequently, it should be given a higher sensitivity rating.

Action 204

The migration service 200 migrates the identified software modules from the first environment 110 to a second environment 120.

According to some embodiments herein, the second environment 120 is different from the first environment 110 in at least one of a software component, a hardware component or a version of a software component or a version of a hardware component. And the software component may comprise an operating system, a hypervisor, a docker, a security and encryption library, a runtime execution environment, a python interpreter etc.

For example, in a case where a data center with some servers running a Linux distribution of a certain version, e.g. Ubuntu 14.04, and a critical security flaw has been discovered in this distribution. By moving sensitive software modules to a server running a different Linux distribution where the flaw has not been found, e.g. Slackware, or another version of the distribution, e.g. Ubuntu 14.10, it is possible to keep the service alive with only a slight hiccup during the software modules migration.

This is of course not limited to that the first and second environments 110, 120 have different operating systems. They may have a different versions of hypervisor, or docker etc. Further, they may comprise different hardware components or different version of the hardware component.

Note that the second environment 120, e.g. the destination server, does not have to be geographically close. The only requirement is that the first and second environment 110, 120 are connected in some way, either via wired or wireless networks, e.g. cellular communications networks comprising Second/Third Generation (2G/3G) network, 3G Long Term Evolution (LTE) network, 4G network, Worldwide interoperability for Microwave Access (WiMAX) network, Wireless Local Area Network (WLAN) etc. as well as the emerging 5G, i.e. the 5th generation mobile networks.

With the growing popularity of micro-services, it will become easier to migrate software or software modules. Further, It is fairly easy to introduce Application Programming Interfaces (APIs) in a computing environment or on a platform, which may execute these migrations automatically based on some preset or calculated sensitivity rating of a software module.

A migration may be initiated in a number of ways. A security related mailing list, web page, a database or a web forum usually have a formalized way of reporting issues, allowing a simple computer program to monitor the list, or the page, and initiate migration when a security issue is reported. There may be a first phase where security information is aggregated by a human or computer and sent out in a machine readable format, where each site or data center may examine the list and determines if any of the issues relate to software it is running.

Therefore, according to some embodiments herein, detecting a security flaw in a first environment may be implemented by monitoring security issues in a subscribed mailing list, on a web page, in a database or a web forum. Then detecting a security flaw in the first environment may be based on whether or not the security issues are related to the software modules running on the first environment.

As one example, for computing environment or platforms where security is an issue, it may be good to have, e.g., a restricted mailing list where possible security issues are discussed and solved before making the issue public. For example, the following list may be subscribed:

https://hadoop.apache.org/mailing_lists.html#Security
https://lists.debian.org/debian-security/
http://seclists.org/oss-sec/

By subscribing to such a mailing list and monitoring it for security issues in certain versions, it would be possible to get early warnings of possible security vulnerabilities, and act on them.

According to some embodiments herein, detecting a security flaw on a first environment may be implemented by connecting to an intrusion detection system and detecting a security flaw on the first environment may be based on detecting an intrusion. Further, detecting an intrusion may comprise detecting a compromised service.

In these embodiments, the migration service may be connected to an intrusion detection system. An intrusion detection system (IDS) is a device or software application that monitors network or system activities for malicious activities or policy violations and produces reports to a management station. By connecting to the management station, a migration may be initiated whenever an intrusion is detected according to the reports. For example, if some services in the data center appear to have been compromised, sensitive and/or important services may be migrated off-site, i.e. to another data center. In this scenario, where it is not known which flaw or if any flaw was used in the intrusion, it may be for the best to migrate the sensitive and/or important services to another host which is as different as possible with respect to the original host.

In summary, the method or the different actions performed by the migration service 200 discussed above provides extra protection for sensitive or important software modules by migrating them to a secure environment, and therefore lowering the probability of compromising services and data. For example, If a physical machine is running a certain version of an operating system that is found to have a security flaw, services executing on it can be migrated—in full or only partially— to machines running an operating system without this flaw. Both the physical machine and the software modules, applications or services, being migrated to another environment which is a secure location, are available even during a security breach. If steps are taken to ensure the services have not been compromised before or during migration, such as ensuring data integrity, they will remain safe and secure while the security flaw is being handled. These advantages make the migration service according to embodiments herein an increasingly viable and improved alternative to pulling the network plug. Further, in the migration service method according to embodiments herein, it is not necessary to have knowledge of which process is malicious, or which flaw or flaws, was used to compromise the original system. Moreover, only the software modules or part of the software modules running on the original system, not the original system itself, are migrated to a system which is as different as possible, e.g. different operating system, different hypervisor, etc. Therefore, the migration service according to embodiments also provides an improved way of handling security problems over the method disclosed in U.S. Pat. No. 8,813,240.

Figure 3:
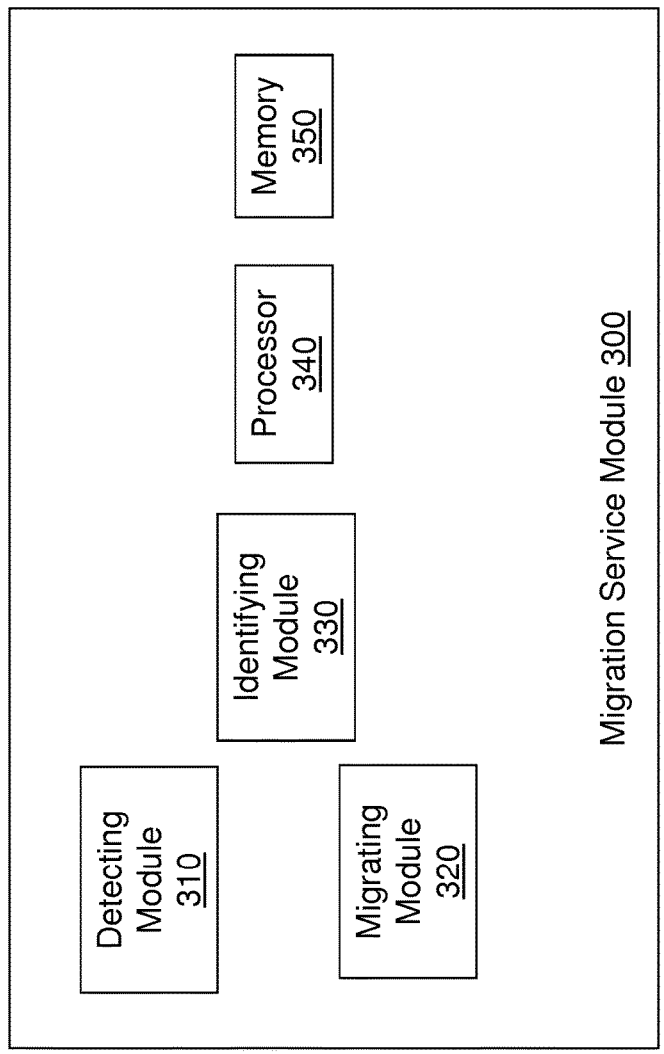
FIG. 3 is a schematic block diagram illustrating embodiments of a migration service module.

To perform the method actions in the migration service 200 for handling security problems in a computing environment 100, described above in relation to FIG. 2, the migration service 200, may be implemented in a server, on a virtual machine hosted with an Infrastructure-as-a-Service (IaaS) provider, as a Software-as-a-Service (SaaS), or in a module shown as a migration service module 300 in FIG. 3. The migration service module 300 may comprise the following circuits or modules as depicted in FIG. 3.

The migration service module 300 is configured to, by means of a detecting module 310 configured to, detect a security flaw in a first environment in which the software modules are running.

The migration service module 300 is further configured to, by means of a migrating module 320 configured to, migrate the software modules or part of the software modules from the first environment to a second environment if a security flaw is detected.

According to some embodiments, the migration service module 300 is further configured to, by means of an identifying module 330 configured to, identify the software modules which are sensitive to the security flaw based on a pre-determined or calculated sensitivity rating. Then the migration service module 300 is further configured to, by means of the migrating module 320 configured to, migrate the identified software modules from the first environment to a second environment.

According to some embodiments, the migration service module 300 is further configured to, by means of the detecting module 310 configured to, monitor security issues in a subscribed mailing list, on a web page, in a database or a web forum, and detect a security flaw in the first environment based on whether or not the security issues are related to the software modules running on the first environment.

According to some embodiments, the migration service module 300 is further configured to, by means of the detecting module 310 configured to, connect to an intrusion detection system, and detect a security flaw in the first environment based on detecting an intrusion.

According to some embodiments, the migration service module 300 is further configured to detect a compromised service.

Those skilled in the art will appreciate that the detecting module 310, migrating module 320, identifying module 330, described above may be referred to one module, a combination of analog and digital circuits, one or more processors, such as processor 340, depicted in FIG. 3, configured with software and/or firmware and/or any other digital hardware performing the function of each module. One or more of these processors, the combination of analog and digital circuits as well as the other digital hardware, may be included in a single application-specific integrated circuitry (ASIC), or several processors and various analog/digital hardware may be distributed among several separate components, whether individually packaged or assembled into a system-on-a-chip (SoC).

The migration service module 300 may further comprise a memory 350 comprising one or more memory units. The memory 350 is arranged to be used to store information, e.g. network or environment system information, security issue list, sensitive rating information or other database, as well as configurations to perform the methods herein when being executed in the migration service module 300.

The embodiments herein for the migration service 200 may be implemented through one or more processors, such as the processor 340 in the migration service module 300 together with computer program code for performing the functions and actions of the embodiments herein. The program code mentioned above may also be provided as a computer program product, for instance in the form of a data carrier carrying computer program code for performing the embodiments herein when being loaded into the migration service module 300. One such carrier may be in the form of a CD ROM disc. It is however feasible with other data carriers such as a memory stick. The computer program code may furthermore be provided as pure program code on a server and downloaded to the migration service module 300.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A migration service method for software modules, the method comprising:
   detecting a security flaw in a first environment in which the software modules are running, wherein the security flaw in the first environment is usable by an intrusion to intrude into the first environment, and wherein the security flaw is attributable to at least one of a software component in the first environment, a hardware component in the first environment, a version of a software component in the first environment, and a version of a hardware component in the first environment; and
   when the security flaw is detected,
   migrating the software modules or part of the software modules from the first environment to a second environment that differs from the first environment by not having the security flaw,
   wherein detecting the security flaw in the first environment comprises:
   monitoring security issues in a subscribed mailing list, on a web page, in a database or on a web forum; and
   detecting the security flaw in the first environment based on whether or not the security issues are related to the software modules running on the first environment,
   wherein migrating the software modules or part of the software modules from the first environment to the second environment further comprises:
   identifying the software modules which are sensitive to the security flaw based on a pre-determined or calculated sensitivity rating; and
   migrating the identified software modules from the first environment to the second environment.

2. The method according to claim 1, wherein either the first or the second environment comprises a physical machine.

3. The method according to claim 1, wherein either the first or the second environment comprises a virtual machine, a Linux container or a docker module.

4. The method according to claim 1, wherein the second environment is different from the first environment in at least one of: not including a same software component as the software component in the first environment, not including a same hardware component as the hardware component in the first environment, not including a same version of a software component as the version of the software component in the first environment, and not including a same version of a hardware component as the version of the hardware component in the first environment.

5. The method according to claim 4, wherein the software component in the first environment comprises one or more of an operating system, a hypervisor, a docker, a security and encryption library, a runtime execution environment, and a python interpreter.

6. A nontransitory computer readable storage medium comprising a migration service module for software modules, the migration service module is configured to perform a method when executed by one or more processors, the method comprising:
   detecting a security flaw in a first environment in which the software modules are running, wherein the security flaw in the first environment is usable by an intrusion to intrude into the first environment, and wherein the security flaw is attributable to at least one of a software component in the first environment, a hardware component in the first environment, a version of a software component in the first environment, and a version of a hardware component in the first environment; and
   when the security flaw is detected, migrating the software modules or part of the software modules from the first environment to a second environment that differs from the first environment by not having the security flaw,
   wherein the migration service module is further configured to:
   monitor security issues in a subscribed mailing list, on a web page, in a database or on a web forum; and
   detect the security flaw in the first environment based on whether or not the security issues are related to the software modules running on the first environment,
   wherein the migration service module is further configured to:
   identify the software modules which are sensitive to the security flaw based on a pre-determined or calculated sensitivity rating; and
   migrate the identified software modules from the first environment to the second environment.

7. The nontransitory computer readable storage medium according to claim 6, wherein either the first or the second environment comprises a physical machine.

8. The nontransitory computer readable storage medium according to claim 6, wherein either the first or the second environment comprises a virtual machine, a Linux container or a docker module.

9. The nontransitory computer readable storage medium according to claim 6, wherein the second environment is different from the first environment in at least one of: not including a same software component as the software component in the first environment, not including a same hardware component as the hardware component in the first environment, not including a same version of a software component as the version of the software component in the first environment, and not including a same version of a hardware component as the version of the hardware component in the first environment.

10. The nontransitory computer readable storage medium according to claim 9, wherein the software component in the first environment comprises at least one of an operating system, a hypervisor, a docker, a security and encryption library, a runtime execution environment, and a python interpreter.

* * * * *